(12) United States Patent
Singh et al.

(10) Patent No.: US 11,538,500 B1
(45) Date of Patent: Dec. 27, 2022

(54) DISTRIBUTED VIDEO CREATION

(71) Applicant: Omgiva, LLC, Salisbury, NC (US)

(72) Inventors: Amar Singh, Salisbury, NC (US); Shyam Somanadh, Bangalore (IN)

(73) Assignee: Omgiva, LLC, Salisbury, NC (US)

( * ) Notice: Subject to any disclaimer, the term of this patent is extended or adjusted under 35 U.S.C. 154(b) by 0 days.

(21) Appl. No.: 17/588,755

(22) Filed: Jan. 31, 2022

(51) Int. Cl.
*G11B 27/031* (2006.01)
*G06T 7/00* (2017.01)

(52) U.S. Cl.
CPC .......... *G11B 27/031* (2013.01); *G06T 7/0002* (2013.01); *G06T 2207/10016* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 9,552,842 | B2 * | 1/2017 | Parente | H04N 21/854 |
| 2008/0010601 | A1 * | 1/2008 | Dachs | H04N 5/222 |
| | | | | 348/E5.022 |
| 2009/0196570 | A1 * | 8/2009 | Dudas | G11B 27/034 |
| | | | | 709/206 |
| 2013/0343726 | A1 * | 12/2013 | Shackleton | H04N 21/4532 |
| | | | | 386/282 |
| 2015/0117840 | A1 * | 4/2015 | Parente | H04N 21/854 |
| | | | | 386/282 |
| 2015/0149906 | A1 * | 5/2015 | Toff | G11B 27/031 |
| | | | | 715/723 |
| 2016/0078900 | A1 * | 3/2016 | Baron | H04N 21/23109 |
| | | | | 386/282 |
| 2017/0201745 | A1 * | 7/2017 | Abramov | H04N 17/002 |
| 2017/0220854 | A1 * | 8/2017 | Yang | G06V 10/431 |
| 2018/0014077 | A1 * | 1/2018 | Hou | H04N 21/25841 |
| 2019/0068916 | A1 * | 2/2019 | Arora | H04N 1/00 |
| 2019/0179876 | A1 * | 6/2019 | Zhang | G06F 40/106 |
| 2019/0349619 | A1 * | 11/2019 | Hou | H04N 21/4722 |
| 2020/0335132 | A1 * | 10/2020 | Fahy | G11B 27/031 |

* cited by examiner

*Primary Examiner* — Gelek W Topgyal
(74) *Attorney, Agent, or Firm* — Polygon IP, LLP

(57) ABSTRACT

One or more video creation configuration parameters may be selected based on user input. A plurality of remote computing devices may be selected based at least in part on the video creation configuration parameters. A respective video creation request message may be transmitted to each of the remote computing devices. A plurality of video creation response messages may be received from the remote computing device. Each response message may include a respective input video. An aggregate video may be rendered based on the input videos and stored on a storage device.

20 Claims, 7 Drawing Sheets

DISTRIBUTED VIDEO CREATION

FIELD OF TECHNOLOGY

This patent document relates generally to video rendering and more specifically to the aggregation of video clips into a composite video.

BACKGROUND

A rendered video frequently incorporates multiple input video clips. For example, a film is typically composed of a series of separate shots that are stitched together to create a single video. As another example, potentially many different video clips created by different individuals may be combined to create an aggregate video on a topic. Accordingly, improved techniques for rendering videos based on different input video clips are needed.

Overview

According to various embodiments, techniques and mechanisms described herein provide for systems, devices, methods, and machine readable media for generating composite or aggregate videos. According to various embodiments, one or more video creation configuration parameters may be determined based at least in part on user input. A plurality of remote computing devices may be selected based at least in part on the video creation configuration parameters. A respective video creation request message may be transmitted to each of the remote computing devices. A plurality of video creation response messages may be received from the remote computing devices, where each of the video creation response messages includes a respective input video. An aggregate video may be rendered based on the plurality of input videos. The aggregate video may be stored on a storage device.

In some embodiments, rendering the video may involve storing a plurality of segment indicators, where each of the segment indicators may identify a respective one of the input videos. The aggregate video may be transmitted to a designated one of the remote computing devices. A response message may be received from the designated remote computing device and may include a segment indicator and a reaction to the respective input video associated with the segment indicator. The aggregate video may be updated to indicate the reaction in association with a portion of the aggregate video corresponding with the respective input video.

According to various embodiments, a designated one of the video creation request messages includes a quality parameter. Whether a designated one of the input videos satisfies the quality parameter may be determined. A feedback message may be transmitted in response to the designated input video.

In some implementations, whether a designated one of the input videos has a length exceeding a minimum length threshold and not exceeding a maximum length threshold may be determined. The designated input video may be rejected when it is determined that the length does not exceed the minimum length threshold or exceeds the maximum length threshold.

In some embodiments, the video creation configuration parameters may include a video length parameter. A target number of remote computing devices may be determined based at least in part on the video length parameter. The plurality of remote computing devices may be selected based at least in part on the target number of remote computing devices.

According to various embodiments, the video creation configuration parameters may include a target number of input videos. A target number of remote computing devices may be determined based at least in part on the target number of input videos. The plurality of remote computing devices may be selected based at least in part on the target number of remote computing devices.

In some embodiments, a designated one of the video creation request messages includes an instruction to present a video creation script on a display screen during creation of a designated input video. A designated one of the remote computing devices may be a smart phone that includes a camera.

In some implementations, the video creation configuration parameters may include a topic. The plurality of remote computing devices may be selected at least in part based on the topic. Each of the video creation request messages may identify the topic.

According to various embodiments, an ordering of the input videos may be determined based on user input. A timeline including the input videos positioned based on the ordering may be presented on a display screen. Rendering the aggregate video may involve joining the input videos sequentially in the determined order.

In some embodiments, one or more of the remote computing devices may be associated with one or more individual classification parameters. The configuration parameters include one or more or more topic classification parameters. The plurality of remote computing devices may be selected at least in part by comparing the individual classification parameters with the topic classification parameters.

According to various embodiments, at least a portion of a first one of the input videos received from a first one of the remote computing devices may be transmitted to a second one of the remote computing devices. A second one of the input videos may be received from the second computing device after transmitting at least a portion of the first input video to the second remote computing device.

In some implementations, the one or more video creation configuration parameters may include a first parameter received from a designated one of the remote computing devices.

BRIEF DESCRIPTION OF THE DRAWINGS

The included drawings are for illustrative purposes and serve only to provide examples of possible structures and operations for the disclosed inventive systems, apparatus, methods and computer program products for video rendering. These drawings in no way limit any changes in form and detail that may be made by one skilled in the art without departing from the spirit and scope of the disclosed implementations.

DETAILED DESCRIPTION

Techniques and mechanisms described herein for the creation of a distributed video. A distributed video, also referred to herein as an aggregated video or a composite video, includes input video clips created by different individuals using different remote computing devices. A distributed video can be configured at a central location. Then, requests for input videos may be sent to multiple remote computing devices. Videos received in response to these requests may be validated and made available for aggregate video creation. Aggregate video creation may involve positioning the input videos on a timeline or otherwise ordering them and then rendering an aggregate video based on the input videos and the ordering information. The resulting aggregate video may be made available for user interactions. For instance, users may provide feedback, reaction, or commentary specific to particular input videos within the aggregated video. That feedback, reaction, or commentary may then be made available for others to view and react to.

Many organizations and individuals use video to tell stories or convey messages. Many such stories and messages include multiple inputs, potentially generated by multiple sources. For example, an organization may wish to make a video that includes content from individuals across the organization about how the organization's activities reflect its values. As another example, an individual may wish to make a video about a topic that includes content from many different contacts.

When using conventional techniques, video creation is typically laborious, expensive, and time consuming. For example, a video creator must identify a topic, write a script, find contributors, shoot the video using the contributors and according to the script, aggregate the content, edit the content, publish the content, and capture interactions to the video as a whole. Conventional techniques thus pose numerous technological challenges that must be overcome in order to produce an aggregated video including input from many users in a way that is seamless, efficient, inexpensive, and fast.

In contrast to traditional techniques, techniques and mechanisms described herein provide for fast, efficient creation of aggregated videos. Contributors may automatically be identified and contacted to provide input videos. Contributors may then record and upload their content asynchronously. Content may then be filtered, evaluated, ordered, aggregated, rendered, and published without specialized skills or advanced tools. Finally, interactions with the resulting aggregated video can be captured at the level of the individual contribution (e.g., individual input videos), and then analyzed to reveal insights related to user engagement.

Figure 1:
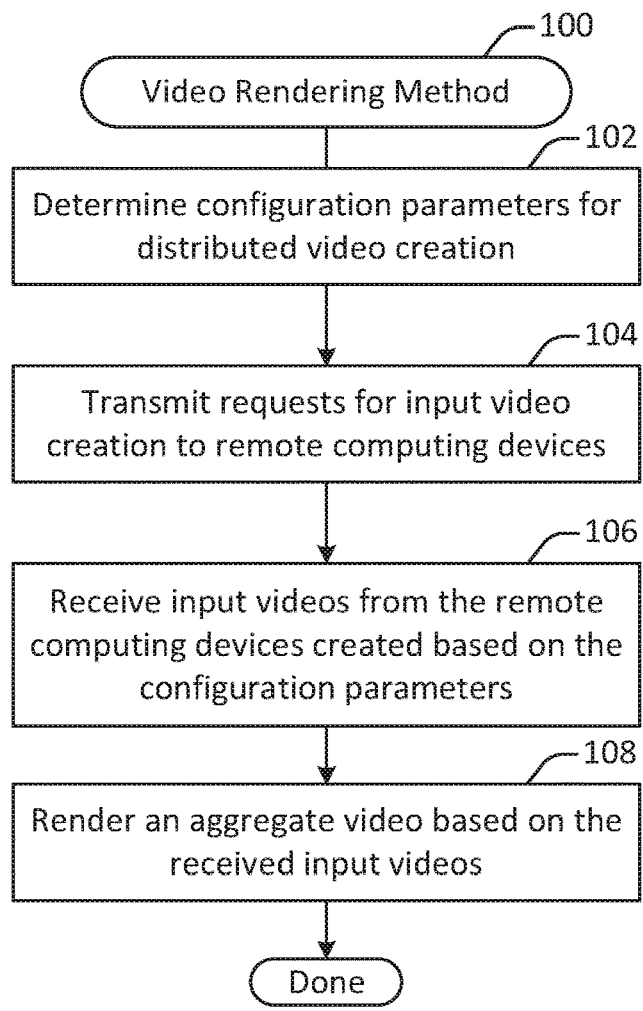
FIG. 1 illustrates an example of a method for rendering a video, performed in accordance with one or more embodiments.

FIG. 1 illustrates an example of a method 100 for rendering a video, performed in accordance with one or more embodiments. According to various embodiments, the method 100 may be used to configure, coordinate, and execute distributed video creation. The method 100 may be performed at a computing device such as the computing device 700 shown in FIG. 7.

One or more configuration parameters for distributed video creation are determined at 102. According to various embodiments, video creation parameters may include any of potentially many different configuration settings governing the selection of remote computing devices for input video creation, the creation of input videos at the selected remote computing devices, selection criteria for selecting input videos for inclusion in an aggregate video, the creation of an aggregate video based on the received input videos, and/or other aspects of the distributed video creation process.

Requests for input video creation are transmitted to remote computing devices at 104. In some embodiments, a request for input video creation may be sent to a web browser, text messaging application, chat application, dedicated input video creation application, or communication address associated with the remote computing device. Computing devices may be designated based on account identifiers, application identifiers, device identifiers, communications addresses such as email addresses or phone numbers, or any other suitable identification mechanism. The specific computing devices to which the requests are sent may be selected at least in part based on the configuration parameters determined at 102. Additional details regarding the selection of remote computing devices and the transmission of input video request messages to the method 300 shown in FIG. 3.

Input videos from the remote computing devices created based on the configuration parameters are received at 104. In some implementations, the remote computing devices may include, for instance, smart phones, desktop computers, tablet computers, laptop computers, and the like. Users of those remote computing devices may employ cameras, microphones, and/or other equipment to create input videos responsive to the requests transmitted at 104. The input videos may then be uploaded or sent via response message for potential inclusion in the aggregate video. Additional details regarding the creation of input videos are discussed with respect to the method 400 shown in FIG. 4.

According to various embodiments, a response message may be sent in any of various ways. For example, the response message may be sent to the video processing and rendering system via a video upload service, which may expose a REST API or other type of API through which the remote computing device may upload the video message. As another example, the response message may be sent directly from the client machine after uploading the input video clip to a video upload service. Additional details regarding various configurations are discussed with respect to the system 200 shown in FIG. 2.

An aggregate video is rendered at 108 based on the received input videos. According to various embodiments, rendering the aggregate video may involve operations such as selecting input videos for inclusion, determining an ordering of the selected input videos, and combining the selected input videos in such a way as to be viewable as a single contiguous video. Additional details regarding rendering an aggregate video are discussed with respect to the method 500 shown in FIG. 5.

Figure 2:
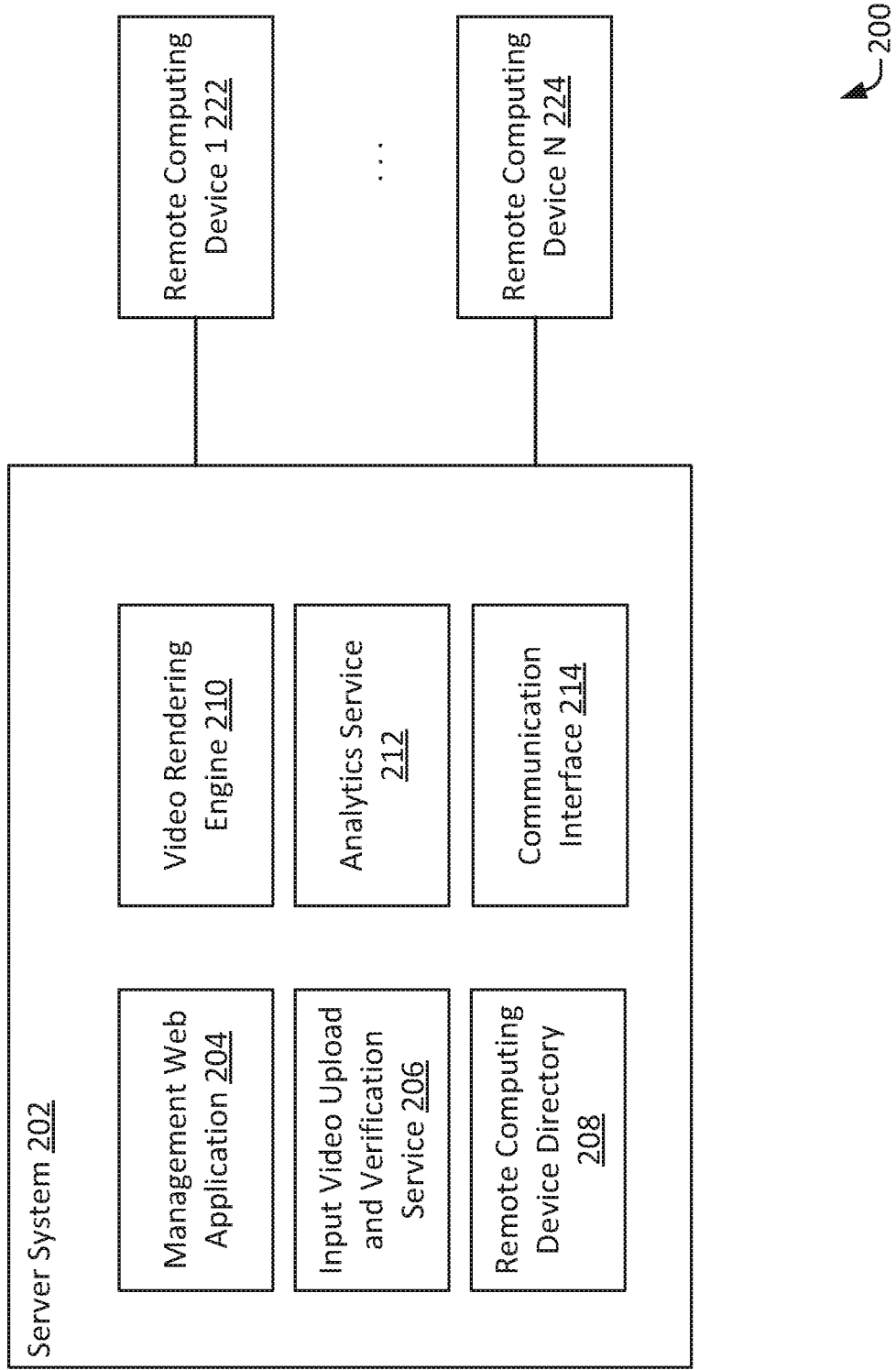
FIG. 2 illustrates an example of a video rendering system, configured in accordance with one or more embodiments.

FIG. 2 illustrates an example of a video rendering system 200, configured in accordance with one or more embodiments. The video rendering system 200 includes a server system 202 and a number of remote computing devices including the remote computing device 1 222 through the remote computing device N 224. The video rendering system 200 may be used to perform techniques described herein. The video rendering system 200 may be composed of hardware including one or more computing devices such as the system 700 shown in FIG. 7.

According to various embodiments, the server system 202 includes a management web application 204, an input video upload and verification service 206, a remote computing device directory 208, a video rendering engine 210, an analytics service 212, and a communication interface 214. In some implementations, one or more of the elements of the server system 202 may be implemented on the same physical computing device. Alternatively, one or more of these elements may be located on different physical computing devices. For instance, one or more of these elements may be implemented as services in a cloud computing environment.

According to various embodiments, the management web application 204 may perform one or more of a variety of tasks. For example, the management web application 204 may facilitate the configuration of a distributed video and the transmission of requests for input videos as discussed with respect to the method 300 shown in FIG. 3. As another example, the management web application 204 may facilitate the processing of input videos for the purpose of configuring the rendering of an aggregate video, as discussed with respect to the method 500 shown in FIG. 5. As yet another example, the management web application 204 may facilitate the distribution of an aggregate video as discussed with respect to the method 600 shown in FIG. 6.

In some implementations, the input video upload and verification service 206 may be configured to receive input videos from remote computing devices, store the videos for later retrieval, and make those videos available for inclusion in an aggregate video. In addition, the input video upload and verification service 206 may be further operable to perform one or more verification tasks for uploaded videos. Such tasks may include analyzing a video to determine whether it is valid according to one or more criteria for input videos. Such criteria may be related to characteristics such as video length, resolution, quality, relevance, or other such features, and are discussed in additional detail with respect to the method 500 shown in FIG. 5.

In some implementations, the remote computing device directory 208 may maintain a directory of potential recipients of requests for input videos. The directory may include contact information for such recipients. Contact information may include, for instance, one or more phone numbers, email addresses, device addresses, application addresses, or the like. Additionally, the directory may include characterization information suitable for use in selecting remote computing devices for receiving a request to create an input video. For example, characterization information may include one or more device characteristics such as form factor or camera resolution. As another example, characterization information may include one or more characteristics of an individual associated with the device, such as organization role, title, gender, race, and past participation in creating one or more distributed videos.

In some implementations, the remote computing device directory 208 may include a group of people related to an organization, such as people who work for a company. Alternatively, or additionally, the remote computing device directory 208 may include a group of people linked together in another fashion, such as a group of friends or family members. In particular embodiments, such a group of people may be linked together within a social networking platform. Such platforms may include, but are not limited to: Facebook, Twitter, LinkedIn, or Instagram.

According to various embodiments, the video rendering engine 210 may refer to any service capable of merging together a sequence of input videos into an aggregate of the individual parts. In particular embodiments, supplemental content such as one or more images, audio segments, other videos, or text segments may be included as well. Examples of suitable video rendering engines include online services such as Cloudinary and Shotstack as well as locally implemented software such as FFMpeg.

In some implementations, the video analytics service 212 may be configured to perform one or more tasks related to prediction or analysis. For example, the video analytics service 212 may be configured to analyze system performance for previously created distributed videos to predict outcomes such as an overall response rate for input video requests and/or a probability that a particular individual will respond to an input video request. As another example, as is discussed with respect to the method 600 shown in FIG. 6, the video analytics service 212 may be configured to analyze user engagement with aggregated videos to produce insights into user opinions and feelings.

In some implementations, the video analytics service 212 may be configured to support a variety of operations. For example, the video analytics service 212 may facilitate operations such as video tagging. As another example, the video analytics service 212 may facilitate the storing and searching of video access history. As yet another example, the video analytics service 212 may identify which types or characteristics of videos are associated with more or more positive feedback. As still another example, the video analytics service 212 may provide for suggestive and intelligent storytelling, guiding users and/or administrators to create improved aggregate videos based on past video performance.

According to various embodiments, a remote computing device may refer to any device, such as a mobile phone, laptop computer, tablet computer, or desktop computer, that is capable of creating an input video. As used herein, the term "remote computing device" may refer to a specific device selected for receiving a request to create an input video. Alternatively, or additionally, the term "remote computing device" may refer to any computing device associated with an individual selected to receive such a request. A remote computing device may interact with the server system 202 through a webpage accessed via a web browser, through a dedicated application, or through some combination thereof.

According to various embodiments, the communication interface 214 may provide one or more mechanisms by which a remote computing device may communicate with the server system 202. For example, the communication interface 214 may expose an application procedure interface (API) such as a REST API. As another example, the communication interface 214 may include a notification service configured to transmit notification messages such as requests to provide input video clips.

Figure 3:
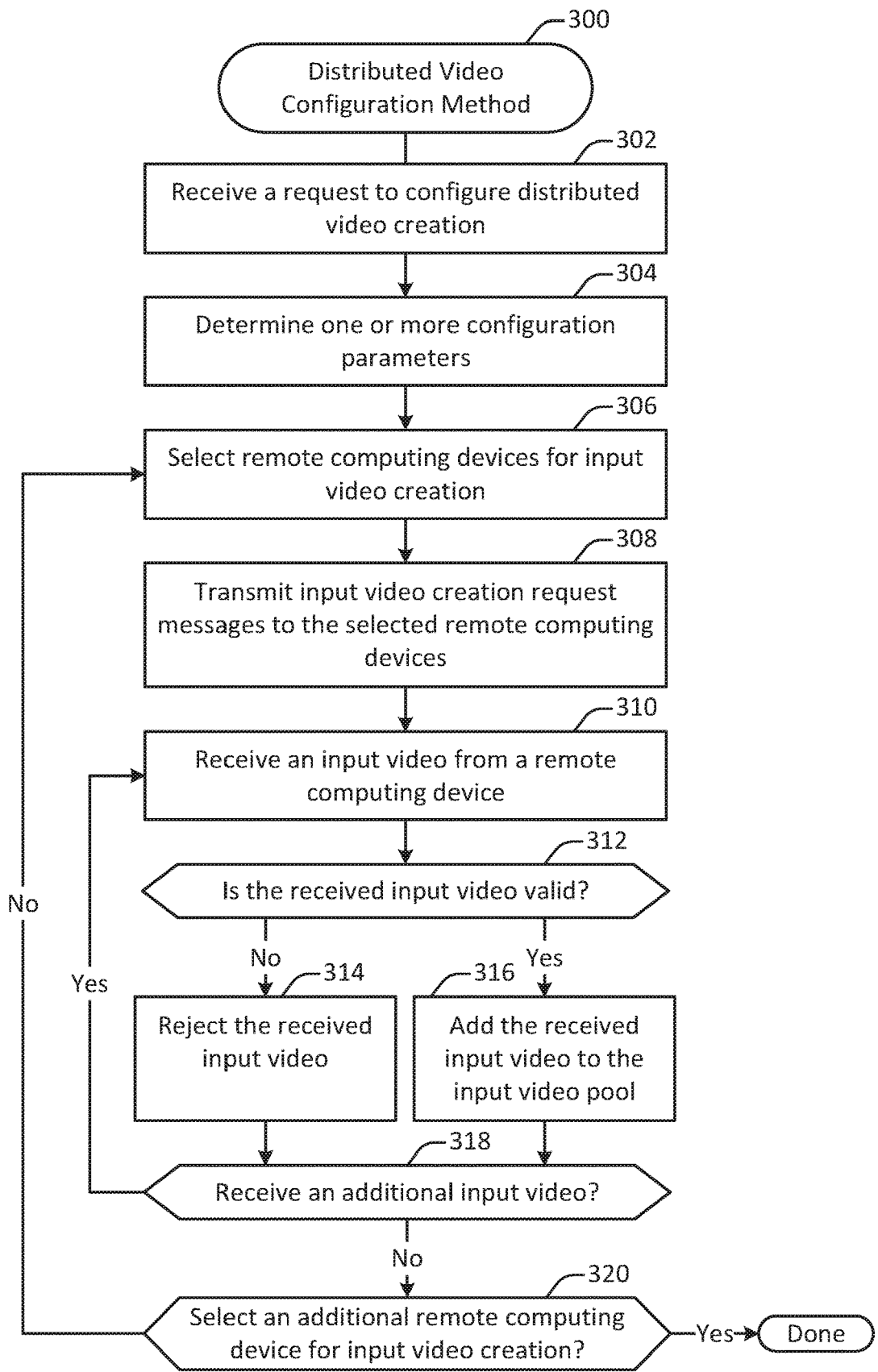
FIG. 3 illustrates an example of a method for input video configuration, performed in accordance with one or more embodiments.

FIG. 3 illustrates an example of a method 300 for distributed video configuration, performed in accordance with one or more embodiments. According to various embodiments, the method 300 may be used to configure and coordinate distributed video creation. The method 300 may be performed at a computing device such as the computing device 700 shown in FIG. 7.

In particular embodiments, one or more portions of the method 300, as well as other administrative tasks described herein, may be performed based on user input. Alternatively, or additionally, one or more portions of the method 300 may be performed algorithmically, for instance based on insights provided by the analytics service.

A request to configure distributed video creation is received at 302. According to various embodiments, the request may be generated based on user input. For instance, a user of a distributed video creation system may request to create a new distributed video.

One or more configuration parameters are determined at 304. In some implementations, a configuration parameter may be determined based on user input. Alternatively, or additionally, one or more configuration parameters may be determined automatically or dynamically. For example, an organization or individual may specify one or more default configuration parameters applicable to various distributed videos.

According to various embodiments, any of a variety of configuration parameters may be determined. Possible configuration parameters may include, but are not limited to: a number of input videos to include in an aggregate video, a number of valid input videos to collect, a length in time of the distributed video, a number of remote computing devices from which to request input videos, one or more topics for the distributed video, one or more criteria for selecting remote computing devices for input video creation, a quality characteristic for input videos, a script guiding the creation of an input video, an instruction guiding the creation of an input video, and a time period in which the distributed video is to be created.

Remote computing devices for input video creation are selected at 306. According to various embodiments, a remote computing device may be selected based at least in part on one or more of the configuration parameters determined at 304. For example, a target number of remote computing devices from which to request input videos may be determined based on factors such as the time period in which the distributed video is to be created, a targeted length of the distributed video, a number of input videos to include in an aggregate video, and a number of valid input videos to collect.

In some implementations, such parameters may be supplemented by other information, such as a predicted response rate. A response rate may be predicted at least in part by analyzing system performance over time. For instance, the system may determine that users tend to submit videos in response to about 20% of requests for input videos.

In some embodiments, remote computing devices for input video creation may be selected from a list or directory known to the system. For example, an organization directory may be used to select email addresses of individuals from whom to request input videos. As another example, a list of remote computing devices having installed thereon a dedicated application for distributed video creation may be used as a basis for selecting particular remote computing devices for creating an input video for a particular distributed video.

In particular embodiments, a remote computing device may be associated with an individual. In such a situation, characteristics associated with the individual may be used to select the remote computing device for receiving an input video creation request. For example, remote computing devices may be selected so as to achieve diversity, cohesion, or selection along dimensions such as age, race, gender, role, education, professional experience, or personal experience. As another example, remote computing devices may be selected so that user characteristics match selection criteria determined at 304.

According to various embodiments, other selection criteria may include, but are not limited to: whether an individual has contributed a video in the past, the number of previous videos an individual has contributed, whether an individual has been asked to contribute a video in the past, whether an individual has contributed a video related to a particular topic, an individual's demographic information, an individual's organizational role, an individual's affinities or preferences, an individual's predicted response rate, an individual's predicted response time, a number of days in which a response is requested, feedback provided by an individual, or any other suitable criteria.

Input video creation request messages are sent to the selected remote computing devices at 308. According to various embodiments, an input video creation request message may be sent to a remote computing device via any of a variety of techniques. Such techniques may include, but are not limited to: an email, a text message, a message to a dedicated video creation application, and a message sent to a web browser. In particular embodiments, the remote computing device may communicate with the video processing system via an API, such as a REST API.

In some embodiments, an input video creation request message may include one or more instructions for video creation. Such instructions may include any of the parameters determined at 304. For instance, an input video creation request message may include a script for the recipient to read during video creation, as well as an instruction to the remote computing device to present the script as a teleprompter overlay during the video creation process. In particular embodiments, an end user may be authorized to supplement, edit, or remove all or a portion of the script.

An input video is received from a remote computing device at 310. In some embodiments, the input video may be attached directly to a response message. Alternatively, or additionally, the input video may be uploaded to a dedicated storage location. Other information may be included along with the input video. For example, a response message may identify the remote computing device from which the input video originated and/or one or more individuals featured in the input video. As another example, a response message may identify a time, date, or location at which the input video was created.

A determination is made at 312 as to whether the received input video is valid. In some implementations, the determination may be made by evaluating the input video against one or more quality criteria. For example, the input video may be compared against a minimum and/or maximum length to determine whether the input video is of sufficient but not excessive length. As another example, the input video may be analyzed to determine whether it is of sufficient clarity, resolution, or topical relevance.

If it is determined that the received input video is not valid, then it is rejected at 314. In some implementations, rejecting an input video may involve sending a rejection message to the remote computing device that generated the input video. The rejection message may identify one or more reasons that the input video was rejected. In such a situation, the recipient may elect to create and submit a replacement input video.

If instead it is determined that the received input video is valid, then it is added to the input video pool at 316. Once added to the input video pool, the input video may be evaluated for inclusion in an aggregate video. The creation of an aggregate video based on one or more input videos is discussed in additional detail with respect to the method 500 shown in FIG. 5.

A determination is made at 318 as to whether to receive an additional input video. According to various embodiments, additional input videos may continue to be received until one or more triggering conditions is met. For example, additional input videos may continue to be received for a designated period of time. As another example, additional input videos may continue to be received until a sufficient number of input videos have been received.

If it is determined not to receive an additional input video, then a determination is made at 320 as to whether to select an additional remote computing device for input video creation. According to various embodiments, the determination may be made at least in part based on factors such as the number of valid input videos received, a targeted period of time remaining for creation of the distributed video, a projected response rate for outstanding input video requests, and the like. In this way, the system can iteratively transmit input video requests to secure enough input videos to support distributed video creation without needing to transmit an input video creation message to every remote computing device known to the system.

Figure 4:
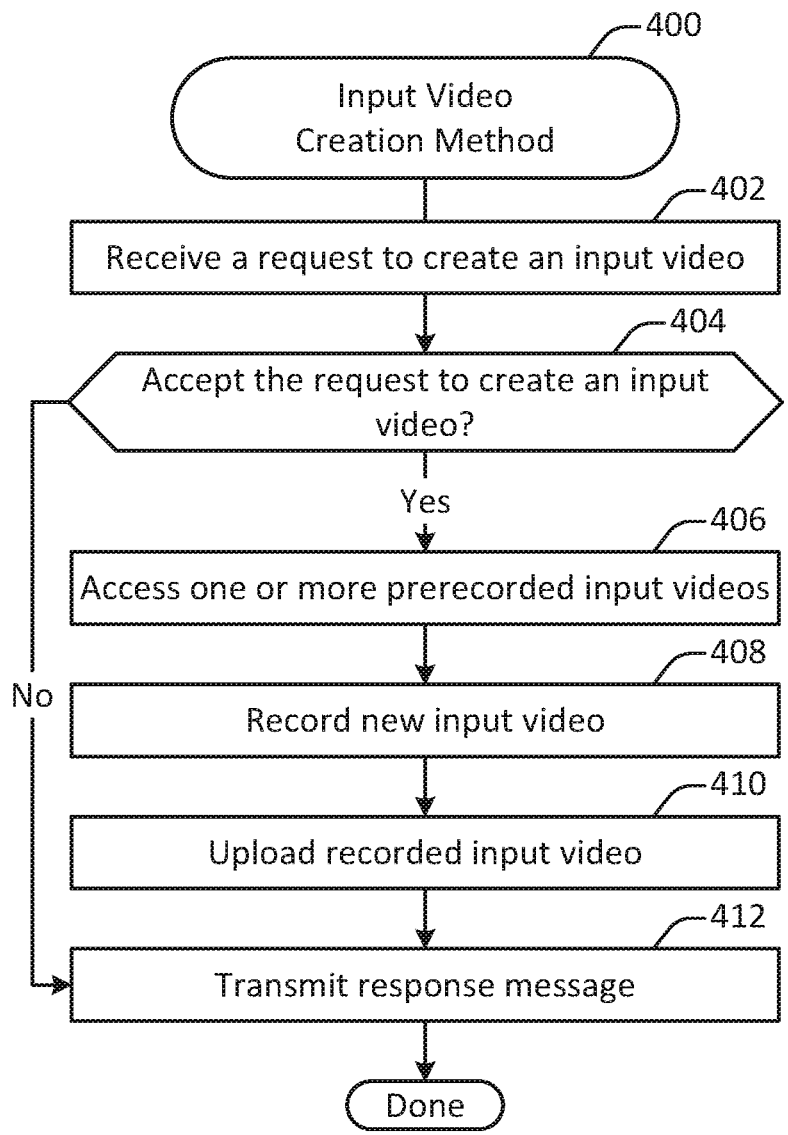
FIG. 4 illustrates an example of a method for distributed video creation, performed in accordance with one or more embodiments.

FIG. 4 illustrates an example of a method 400 for input video creation, performed in accordance with one or more embodiments. The method 400 may be performed at a remote computing device in communication with a distributed video creation system. For example, the method 400 may be performed at a device such as the computing device 700 shown in FIG. 7.

A request to create an input video is received at 402. According to various embodiments, the request may be generated as described with respect to the operation 308 shown in FIG. 3. For instance, the request may be received via a dedicated application, via email, via text message, or via any other suitable communication medium.

In particular embodiments, the request may include information used to guide the creation of an input video. Such information may include a video topic, a minimum length, a maximum length, a resolution requirement, a video script, or other such information.

A determination is made at 404 as to whether to accept the request to create the input video. In some implementations, the determination may be made at least in part based on user input. For instance, a user may provide an indication as to whether to accept or reject a request to generate an input video. Alternatively, or additionally, the request may be generated at least in part based on one or more parameter values. For instance, an application may be set to automatically set or reject certain types of input video requests.

If the request to create an input video is accepted, then at 406 one or more prerecorded input videos is provided. According to various embodiments, the system may be configured to allow users to view input videos that others have recorded in the past. In this way, a user may create an input video that reacts to a previously created input video. The aggregate video may then include both an initial input video and a subsequent input video that reacts to the initial input video. An input video may be accessed by, for example, interacting with a web portal via a web browser or dedicated application to browse and view one or more prerecorded input videos.

In particular embodiments, users may not have access to videos already recorded by other users. For instance, such access may be controlled by a configuration parameter set by a systems administrator or the person configuring the aggregate video creation process.

A new input video is recorded at 408. In some implementations, the new input video may be recorded at the remote computing device itself. For example, a web application accessed through a web browser, a native video recording application, or a dedicated distributed video application may be used to record a new input video. The input video may include sound elements, video elements, image elements, or some combination thereof.

In some embodiments, the new input video may be recorded at a different device and then received at the remote computing device for uploading to the distributed video creation system. For instance, the new input video may be recorded via a dedicated camera or via a smart phone in communication with another computing device.

In particular embodiments, the creation of a video may be accompanied by recording guidance. Recording guidance may include a teleprompter script or other such instructions for creating a video. Such guidance may be included in the request received at 402 or may be generated at the remote computing device. For example, a user may write their own teleprompter script to aid them in producing the video.

In particular embodiments, two or more users may synchronously record one or more input videos. For instance, two or more remote computing devices may participate in a joint video call and record an input video in which video inputs from the different devices are combined in sequence or in parallel to create a synchronous input video clip.

The recorded input video is uploaded at 410. In some implementations, the video may be uploaded to the video upload and verification service 206 shown in FIG. 2. In particular embodiments, the video upload and verification service 206 may provide a response message indicating that the uploaded video fails to meet one or more criteria associated with valid responses to the input video request. In this case, operations 408 and 410 may be repeated until a valid video is created and uploaded.

A response message is transmitted at 412. In some implementations, the response message may include information such as whether the request received at 402 has been accepted or rejected, whether a valid video has been uploaded at 410, and/or any other supporting information. Supporting information may include, for example, the identity of one or more individuals featured within the video, a time and/or location at which the video was captured, and/or whether to include a video or audio component of the video within the aggregate video.

In particular embodiments, the method 400 shown in FIG. 4 may require that the input video be recorded after the receipt of the request at 402. For instance, the video may need to be recorded by a dedicated application and not uploaded from the file system. In this way, the system may enforce a timeliness requirement, ensuring that the aggregate video is composed of input video clips captured within a designated period of time.

In particular embodiments, the method 400 shown in FIG. 4 may require that a particular mobile computing device is limited to uploading a single input video clip. For instance, if a user would like to add a different input video clip, the subsequent input video clip may overwrite the existing input video clip.

According to various embodiments, one or more operations shown in any of the methods described herein may be omitted. For instance, a user need not access a prerecorded input video at 406 in order to create a new input video.

Figure 5:
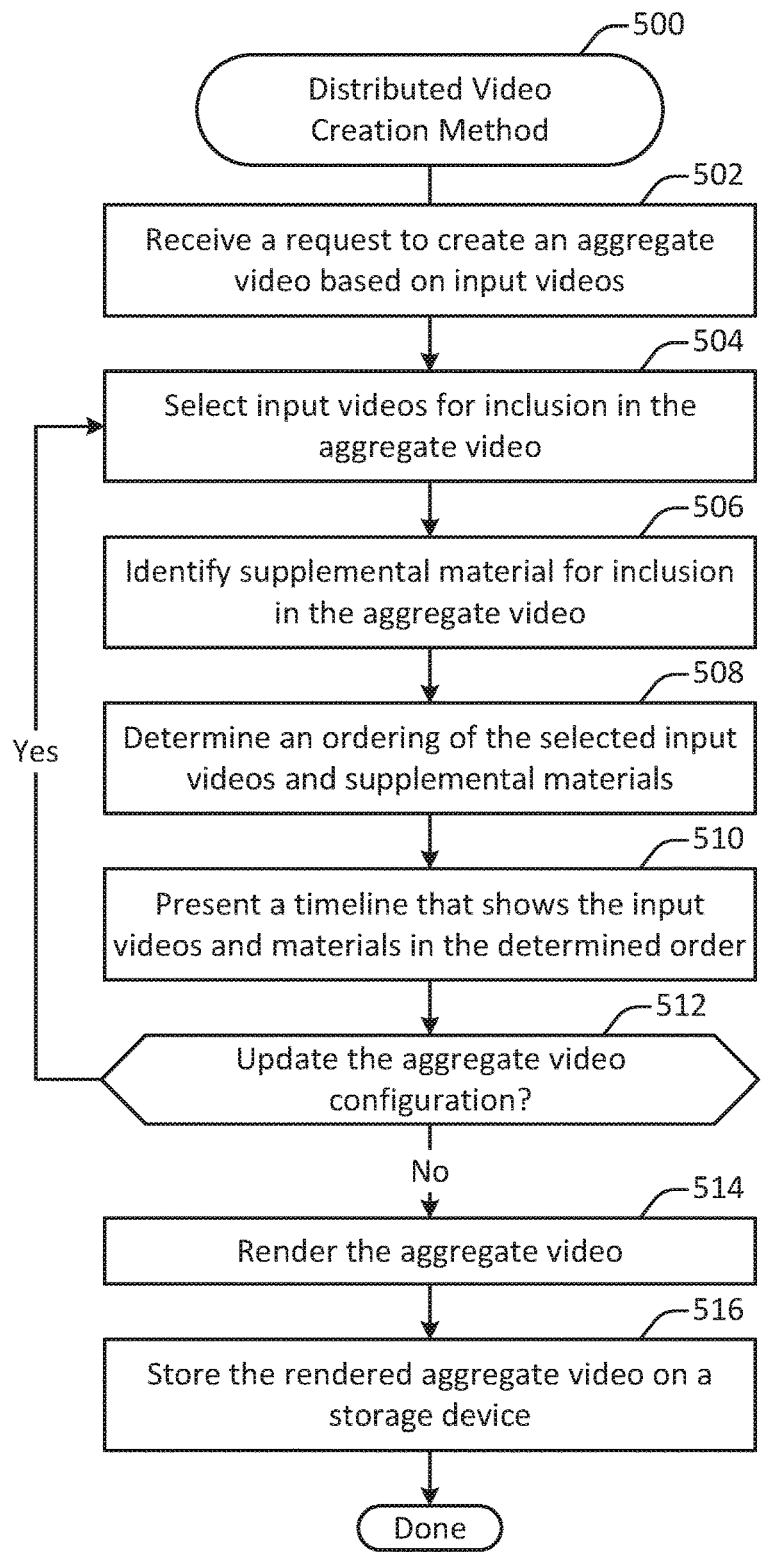
FIG. 5 illustrates an example of a method for distributed video aggregation, performed in accordance with one or more embodiments.

FIG. 5 illustrates an example of a method 500 for distributed video aggregation, performed in accordance with one or more embodiments. According to various embodiments, the method 500 may be used to process the input videos received as described with respect to FIGS. 1-4 into an aggregate video. The method 500 may be performed at a computing device such as the computing device 700 shown in FIG. 7.

A request to create an aggregate video based on input videos is received at 502. In some implementations, the request may be generated manually based on user input. Alternatively, the request may be generated automatically when a triggering condition is met, such as when one or more conditions for the creation of an aggregate video may been satisfied. Such conditions may include, but are not limited to, the collection of a designated number of input videos or the passage of a designated period of time.

Input videos are selected at 504 for inclusion in the aggregate video. In some implementations, input videos may be selected based on user input. For instance, a user may review valid input videos and indicate which videos to include in the aggregate video. Such a selection may be made in, for instance, a graphical user interface that allows input videos to be dragged and dropped onto a graphical timeline.

In particular embodiments, one or more input videos may be selected automatically. For instance, one or more machine learning methods may be applied to identify videos that satisfy criteria such as quality and relevance.

Supplemental material is identified at 506 for inclusion in the aggregate video. In some implementations, supplemental material such as images, videos, audio, text, or the like may be included in the aggregate video, although not ever aggregate video need include such supplemental content. Some such supplemental information may be positioned in between input videos. For instance, an image may be used as a transition between two input videos. Alternatively, or additionally, some such supplemental information may be overlain on input videos. For example, an audio track may be added on top of, or instead of, audio associated with the input videos.

In some embodiments, supplemental material may include one or more filters, enhancements, and/or other alterations. For example, such alterations may alter speed, color, style, reflections, or distortions in one or more video clips. As another example, such alterations may enhance the quality of one or more video clips. As yet another example, such alterations may introduce visual elements such as emoticons, progress bars, or other objects to one or more video clips.

An ordering of the selected input videos and materials is determined at 508. In some implementations, the ordering may be determined based on user input. User input may be provided by clicking on the input videos in a particular order, dragging the input videos onto a timeline, reordering the input videos within a list, or providing a numerical ranking of the input videos.

In some embodiments, input videos may be ordered automatically based on designated criteria. For instance, input videos may be ordered based on length, estimated quality, diversity, coherence, or any other suitable ordering criterion.

A timeline that shows the input videos and supplemental materials is presented at 510. According to various embodiments, the timeline may be presented on a display device. The timeline may provide a graphical representation of the input videos and supplemental materials, allowing a user to review the content before the aggregate video is rendered. S A determination is made at 512 as to whether to update the aggregate video configuration. According to various embodiments, the determination may be made based on user input. For instance, when the user is satisfied with the aggregate video configuration, the user may request to render the aggregate video. Alternatively, or additionally, one or more criteria may be applied to determine whether or not the aggregate video is ready to render. For instance, the aggregate video may not be rendered until a designated length requirement is met.

If it is determined to update the aggregate video configuration, that one or more of the operations 504-510 may be performed again. If instead it is determined not to update the aggregate video configuration, then the aggregate video is rendered at 514. In some implementations, the aggregate video may be rendered by a video rendering engine. Examples of suitable video rendering engines include Cloudinary, Shotstack, and FFMpeg.

In some implementations, rendering an aggregate video may involve performing one or more editing operations. Such operations may include, but are not limited to, altering relative volume and/or lighting levels between clips, cutting and/or pasting content, creating transitions between different audio or video clips, and the like.

In particular embodiments, rendering a video may involve substituting image or audio information for information included in a video clip. For example, a user may request that audio but not video be shown. In such a situation, the recorded video may be replaced with an image, such as a profile picture. As another example, a user may request that video but not audio be shown. In such a situation, the recorded audio may be replaced with music.

In particular embodiments, rendering the aggregate video may involve generate metadata information such as time codes that uniquely identify portions of the video. Such portions may correspond with the input video clips. In this way, users may navigate to particular portions of the aggregate video. Similarly, reactions to portions of the aggregate video may be linked to the appropriate portions of the aggregate video.

The rendered aggregate video is stored on a storage device at 516. According to various embodiments, the storage device may be a local device such as a hard drive or a remote device such as a network attached storage device. Once stored, the aggregated video may be made available for consumption by one or more users. Additional details regarding video access are discussed with respect to the method 600 shown in FIG. 6.

Figure 6:
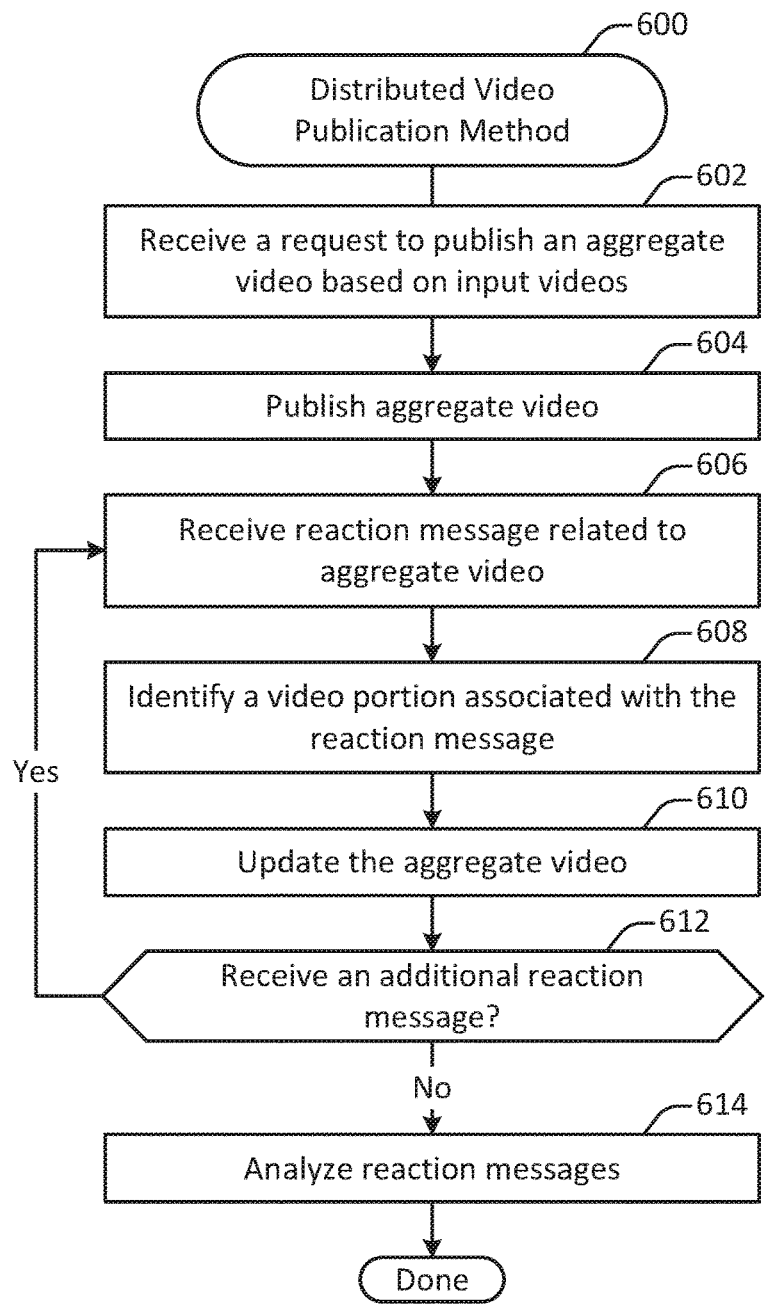
FIG. 6 illustrates an example of a method for distributed video access, performed in accordance with one or more embodiments.

FIG. 6 illustrates an example of a method for distributed video access, performed in accordance with one or more embodiments. According to various embodiments, the method 600 may be used to publish and facilitate interactions with an aggregate video. The method 600 may be performed at a computing device such as the computing device 700 shown in FIG. 7.

A request to publish an aggregate video based on input videos is received at 602. According to various embodiments, the request may be generated automatically, such as immediately after an aggregate video is created. Alternatively, the request may be generated manually, such as based on user input.

The aggregate video is published at 604. According to various embodiments, publishing an aggregate video may involve making it available for access via a dedicated application, web portal, or other publication medium. In some configurations, a message may be sent to one or more remote communication devices indicating that the aggregate video is available for viewing.

A reaction message related to the aggregate video is received at 606. According to various embodiments, the reaction message may indicate a response to the entire aggregate video or to a portion of the aggregate video. The reaction message may include any of a variety of types of reactions. For instance, the reaction message may include a text message, a rating on a designated scale, a thumbs up or down indication, an emoticon, an audio recording, a video recording, an image, or some combination thereof.

In particular embodiments, a reaction message may identify video characteristics that an individual prefers or dislikes. Such characteristics may include, but are not limited to: clip length, topics, video format, video length, and the like. Alternatively, a reaction message may simply indicate a "like", "dislike", or other rating indication.

A video portion associated with the reaction message is identified at 608. In some implementations, the reaction message may pertain to the video as a whole. Alternatively, or additionally, the reaction message may indicate a portion of the aggregate video to which a reaction pertains. For example, the reaction message may indicate a segment identifier that identifies a particular segment of the aggregate video. The segment identifier may indicate, for example, a particular input video within the aggregate video, a group of input videos within the aggregate video, or a particular portion of an input video. In particular embodiments, a reaction message may be received and posted as a reply to a previously-published reaction message.

The aggregate video is updated at 610. According to various embodiments, updating the aggregate video may involve posting a reaction message or a portion of the reaction message received at 606 so that it may be viewed in association with the published aggregate video. In this way, users may conduct a conversation related to not only the aggregate video as a whole, but also with respect to particular portions of the aggregate video. For instance, a user may post a reaction to a single input video used to create the aggregate video, and then other users may post comments reflecting on that reaction.

In particular embodiments, updating the aggregate video may not necessarily involve updating the aggregate video itself, but rather the playback or presentation of the aggregate video. For instance, metadata associated with the playback or presentation of the aggregate video on a webpage or within a dedicated application may be updated to reflect the reaction message.

A determination is made at 612 as to whether to receive an additional reaction message. In some implementations, additional reaction messages may be received indefinitely. Alternatively, reaction messages may continue to be received until a triggering condition is met. Examples of such triggering conditions may include, but are not limited to: the passage of a period of time, the receipt of a designated number of reaction messages, and the indication by an administrator that the period for reactions to the aggregate video is closed.

If no additional reaction messages are to be received, then the received reaction messages are analyzed at 614. In some implementations, the received reaction messages may be analyzed to identify reactions and trends responsive to the aggregate video. For example, sentiment analysis may be used to determine whether the reaction to the aggregate video and/or particular portions of the aggregate video are positive, neutral, negative, or divided. As another example, reaction messages may be analyzed to identify the relative popularity of different portions (e.g., input videos) of the aggregate video. As yet another example, reaction messages may be analyzed to determine whether users agree or disagree with particular messages expressed within different input videos within the aggregate video.

According to various embodiments, the operations shown within methods described herein may be performed in an order different than that shown. For example, reaction messages may be analyzed at 614 before all reaction messages have been received. For instance, reaction messages may be analyzed after each reaction message has been received, periodically, or after the receipt of a designated number of reaction messages.

Figure 7:
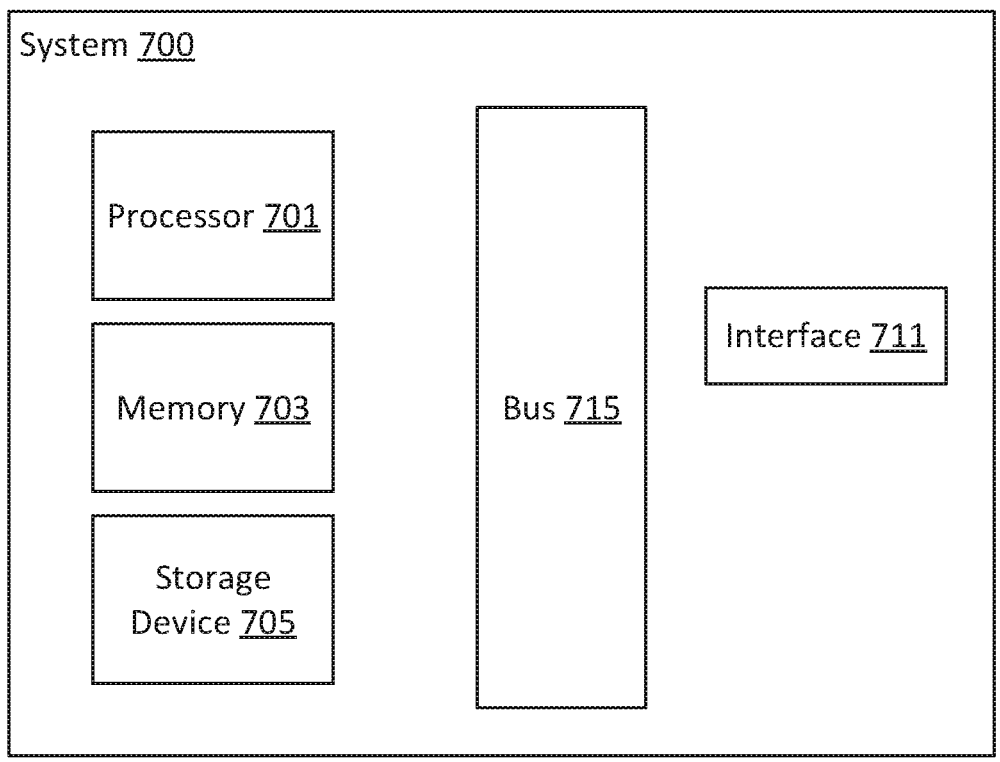
FIG. 7 illustrates one example of a computing device, configured in accordance with one or more embodiments.

FIG. 7 illustrates one example of a computing device 700. According to various embodiments, the computing device 700 may be situated within any of a variety of contexts. For instance, the computing device 700 may be situated within a cloud computing context and interacted with remotely or may be situated within a local context. In some implementations, techniques and mechanisms described herein may be implemented by potentially many different computing devices working in coordination.

According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an mobile computing device, a cloud computing server, a video rendering server, and/or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of smart phones. However, the techniques of disclosed herein apply to a wide variety of computing devices for capturing and rendering videos. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
receiving a request to create a composite video from input videos, the request including user input identifying one or more video creation configuration parameters, the one or more video configuration parameters including a target number of input videos;
determining via a processor a target number of mobile computing devices based at least in part on the target number of input videos and an estimated response rate;
selecting via the processor a plurality of mobile computing devices based at least in part on the video creation configuration parameters including the target number of mobile computing devices;
transmitting via a communication interface a respective video creation request message to each of the mobile computing devices via a native distributed video creation application installed on the mobile computing devices;
receiving via the communication interface a plurality of video creation response messages from the mobile computing devices via the native distributed video creation application, each of the video creation response messages including a respective input video;
rendering an aggregate video based on the plurality of input videos; and
storing the aggregate video on a storage device.

2. The method recited in claim 1, wherein rendering the aggregate video comprises storing a plurality of segment indicators, each of the segment indicators identifying a respective one of the input videos.

3. The method recited in claim 2, the method further comprising:
transmitting the aggregate video to a designated one of the mobile computing devices; and
receiving a response message from the designated mobile computing device, the response message including a segment indicator and a reaction to the respective input video associated with the segment indicator.

4. The method recited in claim 3, the method further comprising:
updating the aggregate video to indicate the reaction in association with a portion of the aggregate video corresponding with the respective input video.

5. The method recited in claim 1, wherein a designated one of the video creation request messages includes a quality parameter, the method further comprising:
determining whether a designated one of the input videos satisfies the quality parameter; and
transmitting via the communication interface a feedback message in response to the designated input video.

6. The method recited in claim 1, the method further comprising:
determining whether a designated one of the input videos has a length exceeding a minimum length threshold and not exceeding a maximum length threshold; and
rejecting the designated input video when it is determined that the length does not exceed the minimum length threshold or exceeds the maximum length threshold.

7. The method recited in claim 1, wherein the video creation configuration parameters include a video length parameter, and wherein a target number of mobile computing devices is determined based at least in part on the video length parameter, and wherein the plurality of mobile computing devices is selected based at least in part on the target number of mobile computing devices.

8. The method recited in claim 1, wherein a designated one of the video creation request messages includes an instruction to present a video creation script on a display screen during creation of a designated input video.

9. The method recited in claim 1, wherein a designated one of the mobile computing devices is a smart phone that includes a camera.

10. The method recited in claim 1, wherein the video creation configuration parameters include a topic, wherein the plurality of mobile computing devices is selected at least in part based on the topic, and wherein each of the video creation request messages include the topic.

11. The method recited in claim 1, the method further comprising:
determining an ordering of the input videos based on user input; and
presenting a timeline on a display screen, the timeline including the input videos positioned based on the ordering, wherein rendering the aggregate video involves joining the input videos sequentially in the determined order.

12. The method recited in claim 1, wherein one or more of the mobile computing devices is associated with one or more individual classification parameters, and wherein the configuration parameters include one or more or more topic classification parameters, and wherein the plurality of mobile computing devices are selected at least in part by comparing the individual classification parameters with the topic classification parameters.

13. The method recited in claim 1, the method further comprising:
transmitting at least a portion of a first one of the input videos received from a first one of the mobile computing devices to a second one of the mobile computing devices; and receiving a second one of the input videos from the second remote computing device after transmitting at least a portion of the first input video to the second mobile computing device.

14. The method recited in claim 1, wherein the one or more video creation configuration parameters include a first parameter received from a designated one of the mobile computing devices.

15. A system comprising:
a processor configured to:
   receive a request to create a composite video from input videos, the request including user input identifying one or more video creation configuration parameters, the one or more video configuration parameters including a target number of input videos,
   determine a target number of mobile computing devices based at least in part on the target number of input videos and an estimated response rate, and
   select a plurality of mobile computing devices based at least in part on the video creation configuration parameters including the target number of mobile computing devices;
a communication interface configured to transmit a respective video creation request message to each of the mobile computing devices via a native distributed video creation application installed on the mobile computing devices and receive a plurality of video creation response messages from the mobile computing devices via the native distributed video creation application, each of the video creation response messages including a respective input video;
a rendering engine configured to render an aggregate video based on the plurality of input videos; and
a storage device configured to store the aggregate video.

16. The system recited in claim 15, wherein a designated one of the video creation request messages includes a quality parameter, and wherein the processor is further configured to determine whether a designated one of the input videos satisfies the quality parameter, and wherein the communication interface is further configured to transmit a feedback message in response to the designated input video.

17. The system recited in claim 15, wherein the processor is further configured to determine an ordering of the input videos based on user input and to present a timeline on a display screen, the timeline including the input videos positioned based on the ordering, wherein rendering the aggregate video involves joining the input videos sequentially in the determined order.

18. One or more non-transitory computer readable media having instructions stored thereon for performing a method, the method comprising:
   receiving a request to create a composite video from input videos, the request including user input identifying one or more video creation configuration parameters, the one or more video configuration parameters including a target number of input videos;
   determining via a processor a target number of mobile computing devices based at least in part on the target number of input videos and an estimated response rate;
   selecting via the processor a plurality of mobile computing devices based at least in part on the video creation configuration parameters including the target number of mobile computing devices;
   transmitting via a communication interface a respective video creation request message to each of the mobile computing devices via a native distributed video creation application installed on the mobile computing devices;
   receiving via the communication interface a plurality of video creation response messages from the mobile computing devices via the native distributed video creation application, each of the video creation response messages including a respective input video;
   rendering an aggregate video based on the plurality of input videos; and
   storing the aggregate video on a storage device.

19. The one or more non-transitory computer readable media recited in claim 18, wherein rendering the aggregate video comprises storing a plurality of segment indicators, each of the segment indicators identifying a respective one of the input videos.

20. The one or more non-transitory computer readable media recited in claim 18, the method further comprising:
   transmitting the aggregate video to a designated one of the mobile computing devices; and
   receiving a response message from the designated mobile computing device, the response message including a segment indicator and a reaction to the respective input video associated with the segment indicator.

* * * * *